G. E. W. HERBERT.
Animal-Poke.
No. 222,903. Patented Dec. 23, 1879.
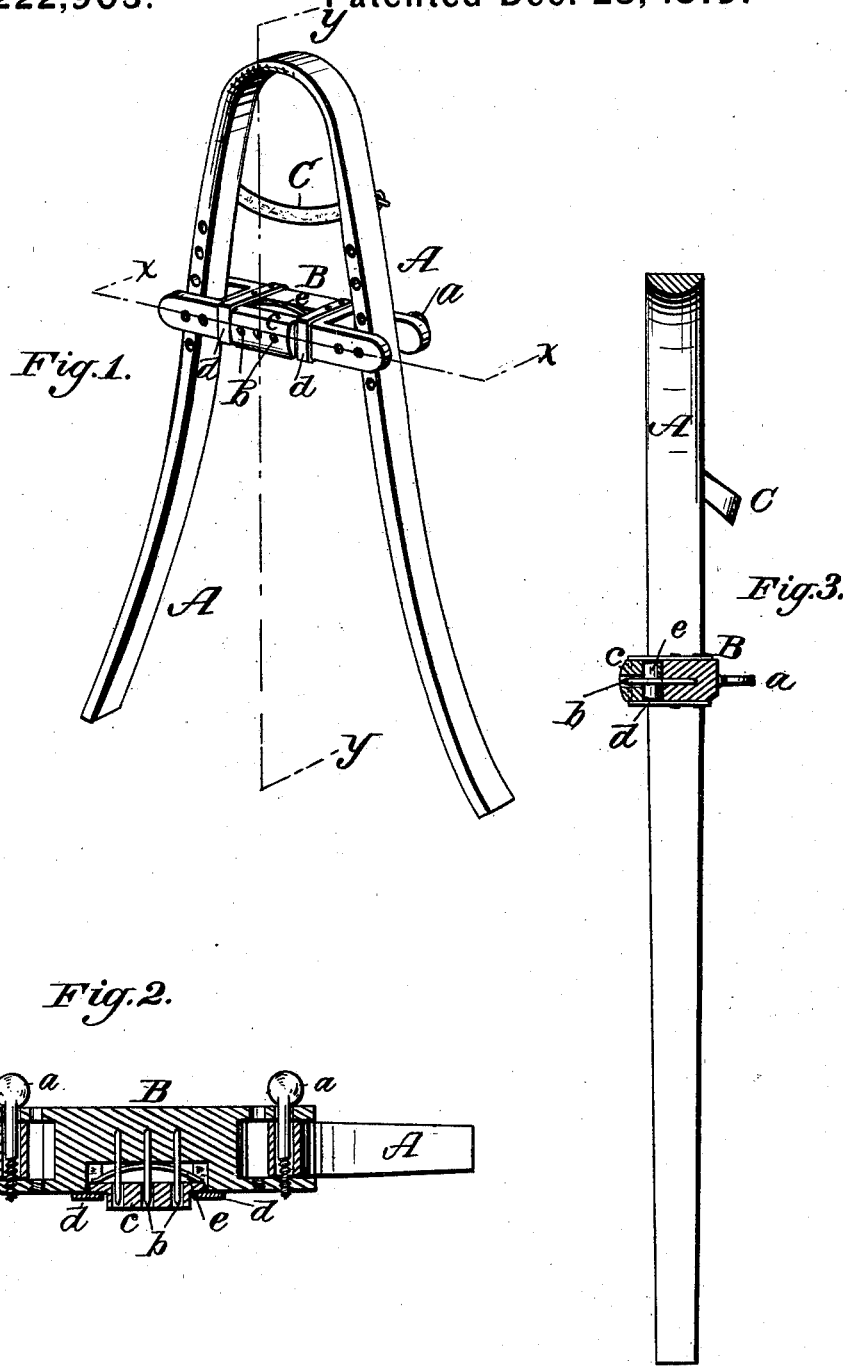

UNITED STATES PATENT OFFICE

GEORGE E. W. HERBERT, OF COHOCTON, NEW YORK.

IMPROVEMENT IN ANIMAL-POKES.

Specification forming part of Letters Patent No. 222,903, dated December 23, 1879; application filed September 23, 1879.

*To all whom it may concern:*

Be it known that I, G. E. W. HERBERT, of Cohocton, in the county of Steuben and State of New York, have invented certain Improvements in Animal-Pokes, of which the following is a specification.

My invention relates to that class of devices known in the art as "pokes," designed to prevent domestic animals from jumping fences and walls; and the invention consists in the peculiar details hereinafter specified.

Figure 1 represents a perspective view of my device; Fig. 2, a cross-section of the same on the line $x\ x$; Fig. 3, a vertical central cross-section of the same on the line $y\ y$.

Referring to the drawings, A represents the body or yoke, consisting of a single bar of wood bent into a ∩ form, with the lower ends curled outward in the manner shown. This outward curvature of the ends is a feature of importance, since it permits the upper end to be fitted closely to the neck of the animal and at the same time gives ample room between the lower ends for the passage of the animal's legs and feet, thus permitting the yoke to be made of full length without interfering with the movements of the animal.

B represents a cross-bar, the ends of which are notched to embrace the arms of the yoke, and secured thereto by removable thumb-screws $a$ passed through the parts, as shown. Each end of the cross-bar and each arm of the yoke is provided with a series of screw-holes, as shown, whereby the height of the bar and the spread of the arms may be varied, so as to adapt the yoke quickly to an animal of any size and kind. On the inner side the cross-bar is recessed and provided with a series of fixed points or teeth, $b$, and with a yielding block, $c$, perforated to permit the passage of the needles through it. The employment of the block shorter than the cross-bar permits the latter to be provided with the series of holes to permit the adjustment of the yoke in width.

The block is held in place by means of two straps or bands of metal, $d$, passing over its ends and secured to the cross-bar. Behind the block there is seated a curved sheet-metal spring, $e$, perforated to fit over and around the needles, which serve to retain it in place, as shown. Spiral springs seated upon and around the needles may be substituted; but they are believed to be inferior to the flat spring. The spring holds the block outward and causes it to conceal and protect the points, so that they will not touch the animal until an attempt is made to mount a fence or wall, whereupon the arms of the yoke are caused to press the cross-bar back and force the needles through the block. An adjustable throat-latch, C, serves to assist in retaining the device in place upon the animal.

I am aware that pokes having a cross-bar and guarded needles therein is old, and therefore I lay no broad claim thereto; but the construction of my device is advantageous on account of its cheapness, strength, and universal adjustability.

I am aware that ox-yokes have been provided with hames instead of the usual bows or loops, and that both the hames and the yoke have been furnished with series of holes to permit the adjustment of the hames.

I am also aware that cattle-pokes have been provided with a cross-bar capable of adjustment in a vertical direction, and that cattle-pokes have been made with yokes of a ∩ form having parallel or substantially parallel arms with straight instead of outwardly turned ends.

What I claim is—

1. The combination of the yoke provided with the series of holes at different heights, the cross-bar provided with the needles and the series of holes at different distances from the ends, and the removable screws, whereby the device is adapted for use on animals of different kinds and sizes.

2. In combination with the yoke and the recessed cross-bar provided with needles, and with a series of adjusting-holes at varying distances from its ends, the movable perforated block seated therein and the flat spring seated behind the block and retained in place by the needles, as shown.

3. The herein-described poke having the yoke with outwardly-curved ends, and the cross-bar connected to the yoke by devices such as shown, adjustable both vertically and laterally, whereby the poke is adapted for use on animals of different kinds and sizes.

GEORGE E. W. HERBERT.

Witnesses:
 SAMUEL H. LEAVITT,
 MARCUS S. HARRIS.